UNITED STATES PATENT OFFICE.

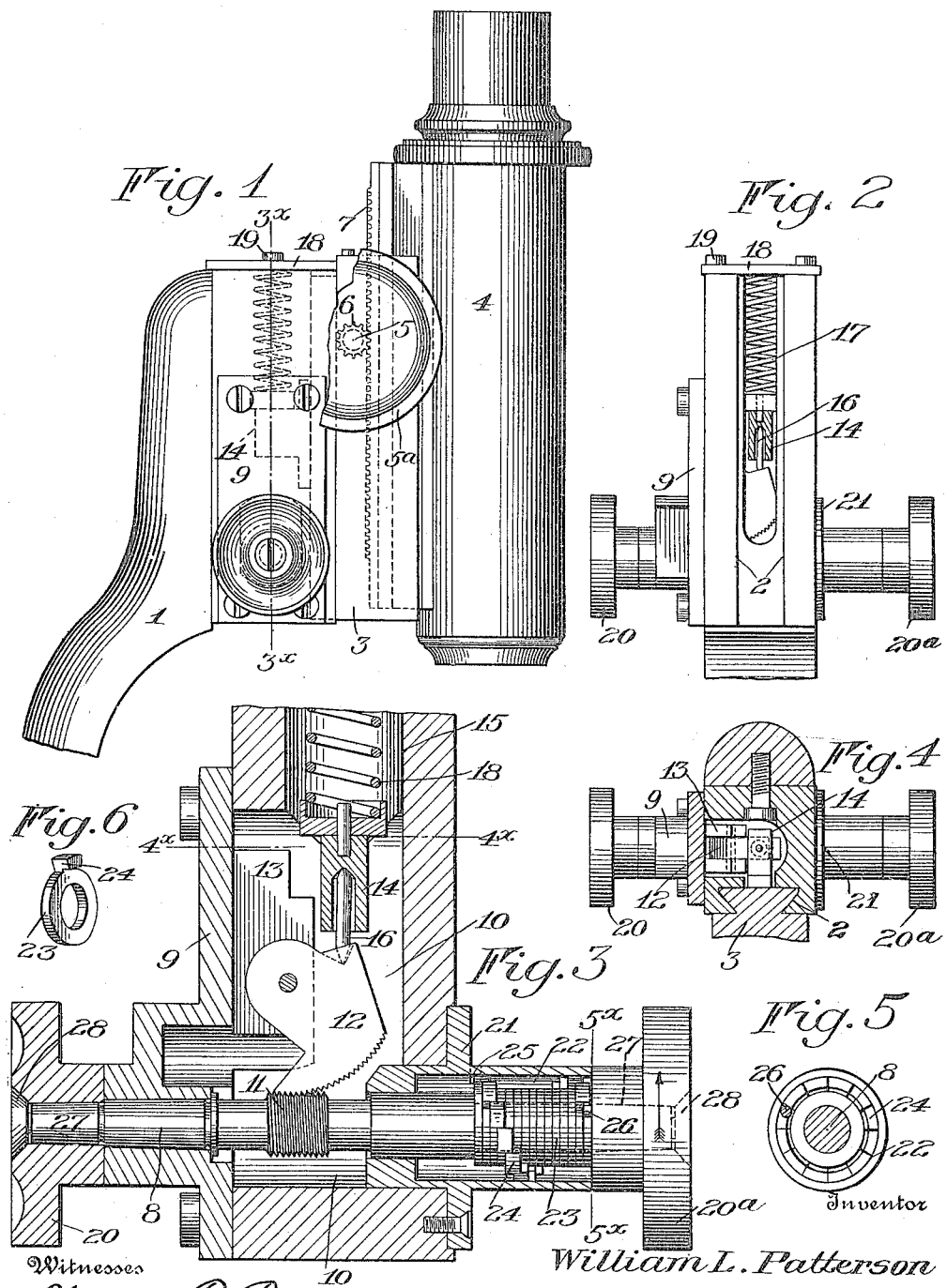

WILLIAM L. PATTERSON, OF ROCHESTER, NEW YORK, ASSIGNOR TO BAUSCH & LOMB COMPANY, OF ROCHESTER, NEW YORK, A CORPORATION OF NEW YORK.

FINE ADJUSTMENT FOR MICROSCOPES.

1,123,583.  Specification of Letters Patent.  Patented Jan. 5, 1915.

Application filed April 10, 1914. Serial No. 830,847.

*To all whom it may concern:*

Be it known that I, WILLIAM L. PATTERSON, of Rochester, in the county of Monroe and State of New York, have invented certain new and useful Improvements in Fine Adjustment for Microscopes; and I do hereby declare the following to be a full, clear, and exact description of the same, reference being had to the accompanying drawings, forming a part of this specification, and to the reference-numerals marked thereon.

My present invention relates to microscopes, especially to "fine adjustment devices" therefor of the type in which the adjusting member or screw is located on the microscope standard in parallelism with and proximity to the axis of the usual "coarse adjusting device," and it has for its object to provide such an adjusting device that will be of simple construction, efficient in operation, and capable of being readily assembled in place.

A further object is to provide an adjustment in which rotation of the adjusting screws in one direction always results in the movement of the lens tube in the same direction, thereby obviating the necessity of constant observation on the part of the operator.

The invention further includes employment of a stop mechanism whereby the motion of the adjusting screw in either direction is limited, in order to obviate the possibility of any strain being applied to a delicate part of the adjusting mechanism.

To these and other ends the invention consists in certain improvements and combinations of parts, all as will be hereinafter more fully described, the novel features being pointed out in the claims at the end of the specification.

In the drawings: Figure 1 is a side elevation of the upper portion of a microscope illustrating my invention applied thereto; Fig. 2 is a front view of the same after removal of the lens tube slide, a portion of which is shown in section; Fig. 3 is a vertical sectional view on the line $3^x$—$3^x$ of Fig. 1; Fig. 4 is a horizontal sectional view on the line $4^x$—$4^x$ of Fig. 3; Fig. 5 is a detail sectional view on the line $5^x$—$5^x$ of Fig. 3, and Fig. 6 is a detail perspective view of one of the tumbler rings used in the stop mechanism for the adjusting screw.

Similar reference numerals throughout the severals views indicate the same parts.

A microscope to which my invention is applied embodies the standard 1, provided with ways 2 on which is guided the slide 3. The slide is similarly provided with ways in which is movably mounted the lens tube 4, the latter being adjusted vertically by means of the usual "coarse adjustment" consisting of a horizontal shaft 5 journaled in the slide, and having fixed thereon a pinion 6 meshing with the rack bar 7 on the lens tube. The shaft 5 carries at each end a milled thumb disk $5^a$ for rotating it.

The adjustment device comprises an adjusting member in the form of a screw shaft 8, held against longitudinal motion and journaled in a bracket 9 removably secured to the side of the standard, said shaft extending transversely of the standard through a recess 10 therein and having at its ends milled thumb disks 20 and $20^a$ by means of which it may be rotated.

In order to transmit the motion of the screw to the slide 3, I provide an intermediate member operatively connected to both the slide and adjusting member. In the present embodiment a screw 11 is provided on the shaft 8 at a point within the standard and coöperating with said screw is a gear segment 12 pivoted between ears 13 on the bracket 9 which extends into the recess 10. It will be seen from this that the screw and coöperating gear segment are mounted on one member in permanent operative relation to each other. Extending inwardly from the slide 3 is a projection 14 entering a recess 15 in the standard in rear of the ways 2. The segment 12 is operatively connected to said projection for the purpose of transmitting its motion to the slide by a connecting member in the form of a pin 16 interposed between and entering bearing recesses in both members. A coil spring 17 accommodated within the recess 15 is held in place by a cover plate 18 secured by screws 19, and exerts a downward pressure upon the upper surface of the projection, thus serving to move the slide in one direction and at the same time hold the pin 16 against accidental displacement.

In order to prevent the rotation of the shaft 8 sufficiently to bring the segment 12, or the slide 3, to a positive stop with the consequent result of stripping the fine threads on the screw and segment by a continued rotation of the shaft, in one direction or the other, I employ a stop mechanism by means of which the motion of the shaft is limited to a predetermined number of revolutions. In the present embodiment of this feature of the invention the shaft extends through a removable bearing 21 which is secured to the standard, and is recessed at its outer end at 22 to receive the stop mechanism. The latter consists of a plurality of freely revoluble stop members or rings 23 preferably arranged loosely on the shaft and housed within the sleeve 22 and each provided with a stop portion 24 adapted to engage corresponding portion on the adjacent disks. The stop portions on the innermost and outermost disks are adapted to coöperate with abutments or stop projections 25 and 26, respectively, the former being stationary on the standard and extending into the recess 22 in the bearing 21 and the latter being carried by the thumb disk 20ª.

In the position of the parts shown in Fig. 3 further motion of the shaft in the direction of the arrow is prevented, as the innermost disk is prevented from movement in this direction by engagement with the stop 25, and each of the succeeding disks held against motion by engagement with the preceding disk. The stop pin 26, engaging the outermost disk therefore limits the motion of the thumb piece 20ª and the shaft 8 to which it is connected.

The shaft 8 and consequently the disk 20ª fixed thereon may be rotated in the direction opposite to that of the arrow in Fig. 3, almost a complete revolution before the stop 26 engages on the opposite side of the stop portion 24 on the adjacent end disk. This disk being freely revoluble in the same direction is also allowed substantially a complete revolution before its stop portion 24 engages the next disk. A similar action takes place with regard to each disk until finally the last disk is reached, the motion of which is limited by engaging with the positive stop 25. Thus it will be seen that the shaft 8 is allowed a sufficient number of revolutions to transmit to the slide 3 the movement desired, and that the rotation of the shaft may be governed by the number of disks employed and the size of the interlocking lugs or projections on each.

While it is desirable in the present instance to secure the brackets 9 and 21 on opposite sides of the standard it will be readily seen that the bearing 21 might be readily made integral with the bracket 9. In the construction shown, the thumb pieces 20 and 20ª are rendered easily detachable for the sake of readily inserting the shaft and disks 23, by forcing them upon tapered portions 27 of the shaft and securing them by screws 28 threaded into the ends of the shaft.

The weight of the lens tube is transmitted through the segment 12 to the shaft 8 thereby urging it constantly in one direction and to resist this motion one end of the shaft is formed with a thrust collar, bearing against the inner surface of the bracket 9. In order to make the shaft readily removable, the journal carried by the bearing 21 is made slightly larger than the thrust collar and also the screw 11. From this it will be seen that the mere removal of the thumb piece 20 permits the withdrawal of the shaft, the stop collars 23 being held between the thumb piece 20ª and the shoulder at the end of the outer journal portion.

I claim as my invention:

1. In a microscope the combination with a standard and a lens tube movable thereon, of a shaft journaled in the standard having a screw thread, and an intermediate pivoted member detachably engaging the screw thread and operatively connected to the lens tube for adjusting the latter on the standard.

2. In a microscope the combination with a standard and a lens tube guided thereon, of a shaft extending transversely of the standard and having a screw thread, and a gear segment coöperating with said screw thread and operatively connected to the lens tube for moving the latter.

3. In a microscope the combination with a standard and a lens tube movable thereon, of a bracket removably attached to the standard, a shaft journaled in the bracket and having a screw thread, a member arranged intermediate the shaft and tube and pivoted on the bracket and coöperating with the screw thread, and an articulated connection between the intermediate member and the lens tube.

4. In a microscope the combination with a standard and a lens tube movable thereon of a bracket attached to the standard, a shaft journaled therein and held against longitudinal motion in the bracket and provided with a screw thread, a gear segment pivoted to the bracket and coöperating with the screw thread, and a connecting member interposed between the segment and lens tube.

5. In a microscope the combination with a standard, a lens tube movable thereon and a bracket secured to the standard, of a shaft journaled in the bracket and having a screw thread, a gear segment pivoted to the bracket and coöperating with the screw thread and lens tube, and a stop mechanism for limiting the rotary movement of the shaft to a predetermined number of revolutions.

6. In a microscope, the combination with a standard and a lens tube guided thereon, of a shaft journaled in bearings in opposite sides of the standard and having a threaded portion intermediate the bearings, and a pivoted gear segment coöperating with the threaded portion and the lens tube, one of the journal portions of the shaft being larger than the threaded portion.

7. In a microscope, the combination with a standard, an adjustable lens tube guided thereon and means for moving said lens tube in opposite directions embodying a rotary member, of a plurality of revoluble stop members, each having means for interlocking with an adjacent stop member, a stationary stop on the standard and a movable stop carried by the rotary member, said stationary and movable stops coöperating with the extreme revoluble stop members.

8. In a microscope, the combination with a standard, an adjustable lens tube guided thereon and means for moving said lens tube in opposite directions embodying a rotary member, of a row of freely revoluble rings carried by said member, and each having a stop portion coöperating with adjacent rings, means for connecting the ring at one end of the row to said revoluble member and a relatively stationary stop arranged to arrest the rotation of the ring at the other end of the row.

9. In a microscope, the combination with a standard, an adjustable lens tube guided thereon and means for moving said lens tube in opposite directions embodying a shaft, of a row of rings surrounding the shaft and each having a stop arranged to coöperate with adjacent rings, a finger on the shaft engaging with the ring at one end of the row and imparting rotative movement thereto and through said ring successively rotating each of the other rings and a relatively stationary stop coöperating with the last ring of the row to arrest its rotary movement.

10. In a microscope, the combination with a standard, a lens tube movable thereon, and a revoluble member for moving the lens tube in opposite directions carried by the standard, of a stop mechanism for limiting the movement of the revoluble member to a predetermined number of revolutions.

11. In a microscope, the combination with a standard, a lens tube movable thereon, and a screw carried by the standard, of an intermediate pivoted member coöperating with the screw and operatively connected to the lens tube for adjusting the latter on the standard, and a stop mechanism for limiting the movement of the screw to a predetermined number of revolutions.

12. In a microscope, the combination with a standard, and a lens tube guided thereon, of a shaft having inner and outer journals carried in bearings on the standard, and having a threaded portion intermediate the bearings, and a member detachably engaging the screw thread and operatively connected to the lens tube for adjusting the latter on the standard, the bearing for the outer journal permitting the passage of the inner journal and threaded portion.

WILLIAM L. PATTERSON.

Witnesses:
WILLIAM G. WOODWORTH,
WILLIAM V. KEIL.